United States Patent [19]

Smith

[11] 4,452,588
[45] Jun. 5, 1984

[54] MATHEMATICAL GAME APPARATUS

[76] Inventor: William O. Smith, 15040 Sprague Rd., Cleveland, Ohio 44130

[21] Appl. No.: 504,814

[22] Filed: Jun. 16, 1983

[51] Int. Cl.³ .......................... G09B 19/02; A63F 9/04
[52] U.S. Cl. .................................. 434/207; 273/146; 434/208
[58] Field of Search .............. 434/191, 207, 208, 209; 273/146

[56] References Cited

U.S. PATENT DOCUMENTS

| | | | |
|---|---|---|---|
| D. 158,196 | 4/1950 | Keast | 273/146 X |
| 239,385 | 3/1881 | Irwin | 434/207 |
| 1,115,441 | 10/1914 | Lake | 434/191 X |
| 1,302,805 | 5/1919 | Jentz | 434/191 X |
| 1,528,061 | 3/1925 | Joyce | 434/191 X |
| 1,696,988 | 1/1929 | Phifer | 434/191 X |
| 1,699,629 | 1/1929 | Troidl | 434/207 |
| 2,811,360 | 10/1957 | Cohen | 434/191 X |
| 2,839,844 | 6/1958 | Lehnkering | 434/207 |
| 2,901,839 | 9/1959 | Huff | 434/207 |
| 3,176,990 | 4/1965 | Aliff | 434/208 X |
| 3,204,345 | 9/1965 | Buckner | 434/208 |
| 3,314,168 | 4/1967 | Heckman | 273/146 X |
| 3,523,377 | 8/1970 | Gardner | 434/209 X |
| 3,744,153 | 7/1973 | Vans Es | 434/191 X |
| 3,959,893 | 6/1976 | Sigg | 273/146 X |
| 4,017,080 | 4/1977 | Severson | 434/191 X |
| 4,281,835 | 8/1981 | Seiden | 434/191 X |

Primary Examiner—William H. Grieb
Attorney, Agent, or Firm—Woodling, Krost & Rust

[57] ABSTRACT

An apparatus for generating arithmetic expressions is disclosed. It comprises sets of number dice and of operator dice. The number dice are provided in two different colors, in order to remove ambiguity arising from the non-cumulative operations of subtraction and division, and to provide a means of designating negative numbers if so desired.

3 Claims, 3 Drawing Figures

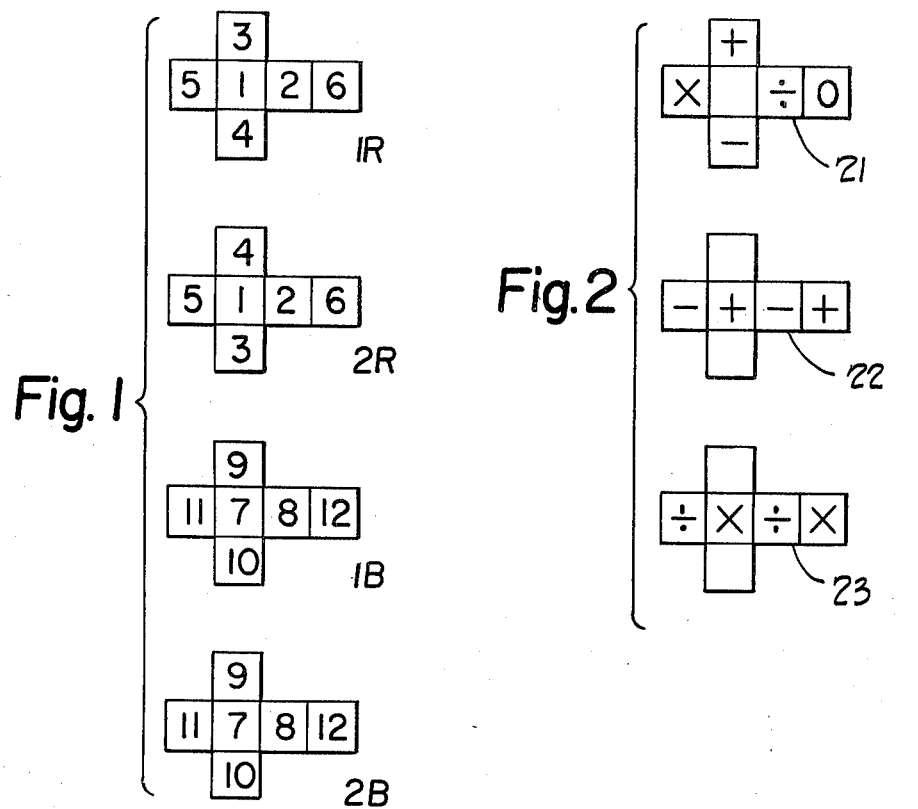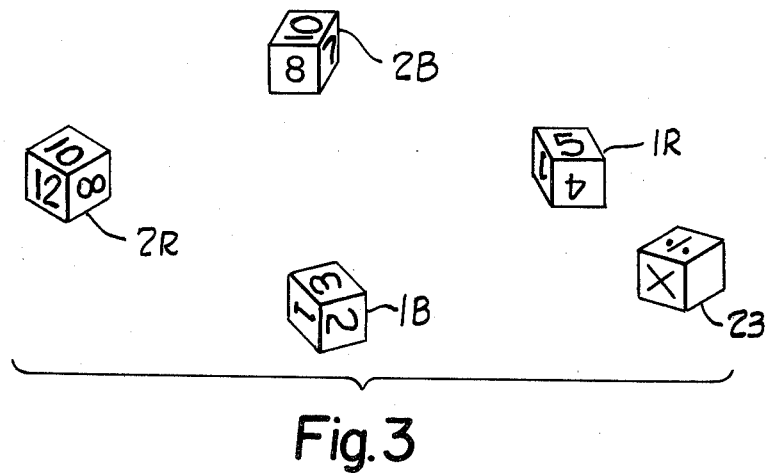

MATHEMATICAL GAME APPARATUS

This invention relates to educational games and devices, and in particular, to apparatus for randomly generating arithmetic expressions to be used in drill or games.

Background of the Invention

It has long been recognized that children and others may be stimulated by the playing of games to practice basic skills. To this end, much apparatus has been devised to encourage such activities. One variety is that of arithmetic practice devices and games which involve the player's performing arithmetic operations on numbers, part or all of the numbers and operations being selected by chance.

The types of apparatus for such selection generally fall into two categories. First, there are sets of playing pieces, typically cards or tiles, each usually bearing a single number or operation. Ordinarily a player is dealt or chooses some collection of these pieces with which to play. The second category is that of devices which themselves may be used to select at random a number or operation from some fixed set. Examples include spinners and dice.

Another useful way of characterizing these systems is with respect to whether both the numbers and operators are separately and independently selected or not. In some games and apparatus therefor, for example, those of U.S. Pat. No. 1,115,441 and 1,699,629, the cards or tiles have numbers and operators on the same piece. In U.S. Pat. Nos. 239,385; 1,696,988; 2,901,839 and 3,176,990, there are dice with numbers but not with operators; the operations are selected by another aspect of the apparatus. Also in U.S. Pat. Nos. 2,811,360 and 3,774,153, some or all of the operators are on a playing board on which tiles are placed. My invention is, however, of the type exemplified in U.S. Pat. Nos. De. 158,196; 1,302,805; 3,204,345; 3,314,168; 3,523,377; 3,959,893 (the foregoing for dice) and in U.S. Pat. Nos. 1,528,061; 4,017,080 and 4,281,835 for cards or tiles. That is, it has separate pieces for the selection of numbers and operators. The following discussion will pertain to the nine patents just listed and their relation to my invention.

The provision of number pieces separate from operator pieces tends to confer a great measure of flexibility and versatility on the kinds of apparatus under consideration. This may be seen by comparing the apparatus of the last nine named U.S. patents with those of the preceding ones. There is an attendant disadvantage, however. When a randomly selected arithmetical operation is to be performed to combine two randomly selected numbers, in order to yield another number of "answer", a unique answer will not be defined if the operation is a non-commutative one, that is, subtraction or division. For example, if the numbers "7" and "4" and the operator "minus" are generated, the "answer" may be either 3 or −3 depending on the order in which the numbers are taken. If it is desired that the apparatus teach understanding of this fact, some additional way of ordering the selected numbers must be provided.

In games in which the players themselves arrange the playing pieces on the order of their choice (U.S. Pat. Nos. 3,314,168; 2,523,377; 3,959,893; 4,017,080; 4,281,835), the problem of ambiguous order described above does not exist, for the player may designated which number is the subtrahend, or which is the divisor. In other games, the particular rules and the spatial layout of the pieces may prevent ambiguity, as in U.S. Pat. Nos. 1,302,805; 1,528,061 and 3,204,345. Until now, however, the ambiguity problem arising from the use of non-commutative arithmetic operators in these types of apparatus has not been solved in any convenient, flexible and natural way.

Summary of the Invention

The apparatus of my invention is a set of playing pieces, preferably dice, with which random selections from different sets of numbers, and from sets of arithmetic operators, may be made. A primary distinguishing feature of my invention is that the number sets are color-coded. By this means, the non-commutative arithmetic operations of substraction and division, when applied to numbers selected by my apparatus, will yield an unambiguous result. This is a particularly valuable feature when the pieces are dice.

Another feature of my invention is the provision of means to limit the selection of arithmetic operations to addition and its inverse operation of subtraction, or if desired, to multiplication and its inverse operation of division. This makes it possible to utilize the apparatus in games or drills which concentrate upon either addition or multiplication, and which teach the intimate relationship between an operation and its inverse.

It is, accordingly, an object of my invention to provide apparatus for generating non-ambiguous arithmetic expressions to be used in drill or games.

Another object of my invention is to provide such apparatus which is helpful in teaching about the inverse arithmetic operations and their relationships to addition and multiplication.

A further object of my invention is to provide an extremely versatile, portable and convenient recreational device which is both entertaining and educational.

Detailed Description of the Preferred Embodiment

My invention is best understood by the following detailed description of a preferred embodiment, and by the drawings, in which:

FIG. 1 is a developed schematic view of four of the dice of my invention;

FIG. 2 is a developed schematic view of three other of the dice of my invention; and FIG. 3 is a perspective view of some of the dice of my invention as shown in a typical situation in use.

In the preferred embodiment of my invention, there are seven dice, pictured in FIGS. 1 and 2 in schematic form.

As seen in FIG. 1, each set has four numbered dice. Two dice have red numbers and two have blue numbers. (Any other two colors may obviously be used.) Two of the numbered dice, shown as 1R and 1B, are numbered 1 to 6. Die 1R or the set of numbers on it, is red. The othe die 1B, or the set of numbers on it, is blue. The other two of the numbered dice, 2R and 2B, are numbered 7–12. Similarly, die 2R has a red background or numbers, and die 2B, blue.

Games are preferably played with each player having his own set of the seven dice, so that players may roll simultaneously if desired. Each set has three indicator dice, shown in FIG. 2 as 21, 22 and 23. One indicator die 21 is marked to indicate all math operations. (×) indicates multiplication; (÷) indicates division; (+) indicates addition; (—) indicates subtraction. The blank surface indicates a choice of function. (0) indicates no function is to be performed. One indicator die 22 has two sides marked (+); two sides are marked (—); the other two sides are blank. One indicator die 23 has two sides marked (X); two sides are marked (÷); the other two sides are blank.

The general manner of using the dice is as follows:

A player rolls one indicator die and either some two or all four number dice. The choice of dice is made according to the drill objective or game being played. The red number or the sum of the red numbers are subtracted from or divided into the blue number or the sum of the blue numbers. The inclusion of both low range (1R and 1B) and high range (2R and 2B) dice in the set not only permits the equipment to serve the needs of students as they advance in arithmetic skills, but also gives more versatility to the set.

For example, two numbered dice (1 through 6, having one die of blue numbers and one of red numbers) are rolled. The numbers rolled are a blue "3" and a red "3" and the indicator die shows (÷). The answer (usually the score for that roll) is a plus 2. However, had the "6" been red and the "3" blue, the answer would be ½. The same principle would apply to subtraction. In the first part of the example (the red "3" would be subtracted from the blue "6"), the answer would be a plus 3; again, had the "6" been red and the "3" blue, the answer would be a minus 3.

When only two numbered dice are being used, and the indicated function is (+) or (X), the color of the numbers on the dice is disregarded and the function is performed. If a red "3" and a blue "6" are rolled and the indicator dice shows (+), the answer is a plus 9. When the indicator dice shows (+), the answer will always be a positive answer. Likewise, when the indicated function is (X), and a red "3" and a blue "6" are rolled, the answer would be a plus 18. When the indicator dice shows (X), the answer will always be a positive answer.

When all four numbered dice are being used, the red and blue numbers of each group (R) and (B) are added before the indicated function is performed. For example, as seen in FIG. 3, a red "10" and red "5" are rolled totalling 15; a blue "10" and blue "3" are rolled totalling 13; and the indicator dice shows (÷), the answer would be 13/15. However, had the color of the numbers been reversed, the answer would have been 15/13. Had a red "2" and red "6" been rolled and had the indicator dice shown (—) and had a blue "4" and blue "12" been rolled, the red "2" and "6" would be added (totalling 8); the blue "4" and the blue "12" would be added (totalling 16); the red total of 8 is subtracted from the blue total of 16, the answer is a plus 8. Had the colors been reversed, the answer would be a minus 8.

When the indicated function is (+) or (X), the two red numbers are added, the two blue numbers are added, then the indicated function is performed.

Many games may be played with my apparatus. For example, the players may alternate throws, cumulating the totals of their individual scores until the first one reaches a fixed sum, or they may compete on individual throws for the highest or lowest "answer". As another example, they may each alternately throw die 1R and 2B and no indicator die, with the winner being the first person such that his die 2B minus his die 1R equals seven or eleven. Many other more complex games may be designed using these dice.

Another way of using my apparatus is to identify a number thrown on a red die with the negative integer of the same absolute value. By this means the student may gain practice in using the concepts that adding the negative of a number is the same as subtracting the number, and subtracting the negative of a number is the same as adding the number.

For convenience, dice are preferred for my invention, but it will be seen that in general any particular die could as well be replaced by six cards, tiles or the like of a particular color, one of which is drawn, dealt, or chosen to select the number or operator thereupon corresponding to a face of the die. It is also clear that the numbers may be other than 1 through 6 and 7 through 12, but those are generally preferred as being most complete for their educational function.

It should be understood that the preferred embodiment as described is merely illustrative of my invention, and that no limitations to the scope of my invention are intended except such as are defines in the claims to follow.

What is claimed is:

1. Instructional apparatus comprising, in combination
   a first die, associated with and bearing a first color and a first set of six numbers, said first die bearing exactly one of each of said first set of numbers upon each of its six faces;
   a second die, associated with the bearing a second color and bearing exactly one of each of said first set of numbers upon each of its six faces;
   a third die, associated with and bearing said first color and a second set of six numbers, and bearing exactly one of each of said second set of numbers upon each of its six faces;
   a fourth die, associated with and bearing said second color and bearing exactly one of said second set of numbers upon each of its six faces;
   a fifth die, bearing upon five of its six faces symbols representing addition, subtraction, multiplication, division and zero, and having a face blank;
   a sixth die, bearing upon two faces a symbol representing addition and bearing upon two other facaes a symbol representing subtraction and having the remaining two faces blank; and
   a seventh die, bearing upon two faces a symbol representing multiplication and bearing upon two other faces a symbol representing division and having the remaining two faces blank.

2. The apparatus of claim 1, and in which each number in said first set of six numbers is less than each number in said second set of six numbers.

3. The apparatus of claim 2, and in which said first set of six numbers consists of the numbers 1,2,3,4, 5,6 and in which said second set of six numbers consists of the numbers 7,8,9,10,11,12.

* * * * *